US008773376B2

(12) United States Patent
Batara (10) Patent No.: US 8,773,376 B2
(45) Date of Patent: Jul. 8, 2014

(54) METHOD FOR ACCESSING ONE APPLICATION OR A SET OF APPLICATIONS FROM OR THROUGH A TOKEN, CORRESPONDING TOKEN AND SYSTEM

(75) Inventor: Akram Batara, Singapore (SG)

(73) Assignee: Gemalto SA, Meudon (FR)

( * ) Notice: Subject to any disclaimer, the term of this patent is extended or adjusted under 35 U.S.C. 154(b) by 242 days.

(21) Appl. No.: 13/126,712

(22) PCT Filed: Oct. 26, 2009

(86) PCT No.: PCT/EP2009/064096
§ 371 (c)(1),
(2), (4) Date: Jul. 14, 2011

(87) PCT Pub. No.: WO2010/049397
PCT Pub. Date: May 6, 2010

(65) Prior Publication Data
US 2011/0261000 A1  Oct. 27, 2011

(30) Foreign Application Priority Data
Oct. 30, 2008  (EP) .................................... 08167977

(51) Int. Cl.
*G06F 3/041* (2006.01)

(52) U.S. Cl.
USPC ........................................................ 345/173

(58) Field of Classification Search
None
See application file for complete search history.

(56) References Cited

U.S. PATENT DOCUMENTS

| 6,738,049 B2 * | 5/2004 | Kiser et al. .................... 345/173 |
| 2004/0145574 A1 | 7/2004 | Xin et al. |
| 2004/0188529 A1 | 9/2004 | Kim |
| 2006/0141990 A1 | 6/2006 | Zak et al. |
| 2007/0082710 A1 | 4/2007 | Jang |
| 2008/0058007 A1 | 3/2008 | Kang |
| 2008/0058016 A1 | 3/2008 | Di Maggio et al. |
| 2008/0104547 A1 * | 5/2008 | Morita et al. .................. 715/863 |
| 2010/0093396 A1 | 4/2010 | Roundtree |

FOREIGN PATENT DOCUMENTS

| EP | 1 462 921 A2 | 9/2004 |
| EP | 1 895 789 A1 | 3/2008 |
| WO | WO 98/32089 A2 | 7/1998 |
| WO | WO 2005/020604 A | 3/2005 |
| WO | WO 2008/042989 A2 | 4/2008 |
| WO | WO 2008/062090 A1 | 5/2008 |

OTHER PUBLICATIONS

International Search Report (PCT/ISA/210) for PCT/EP2009/064096 dated Jan. 4, 2010.
European Search Report for EP 08167977 dated Apr. 24, 2009.

* cited by examiner

*Primary Examiner* — Joseph Haley
(74) *Attorney, Agent, or Firm* — Buchanan Ingersoll & Rooney PC (57) ABSTRACT

The invention relates to a method for accessing an application or a set of applications from or through a token. The token is coupled to a terminal that comprises at least one touch surface. According to the invention, the method comprises steps in which the terminal compares an input touch pattern with at least one predetermined input touch pattern relating to one application or a set of applications accessible from the token, and, according to a comparison result, the terminal sends or not to the token either a command for requesting a display of a set of at least one application accessible from the token or a command for triggering an execution of an application accessible from the token, the command being associated with a matching predetermined input touch pattern. The invention relates also to a corresponding token and a corresponding system comprising the token.

11 Claims, 3 Drawing Sheets

METHOD FOR ACCESSING ONE APPLICATION OR A SET OF APPLICATIONS FROM OR THROUGH A TOKEN, CORRESPONDING TOKEN AND SYSTEM

FIELD OF THE INVENTION

The invention relates, in a general manner, to a method for accessing one application or a set of applications from or through a token.

Moreover, the invention relates to a token for accessing one application or a set of applications from or through the token.

Within the present description, a token is any portable smart object that is intended to cooperate with a host device.

Finally, the invention relates to a system for accessing one application or a set of applications from or through a token wherein the system comprises the token and a terminal cooperating with the token.

STATE OF THE ART

Within the present description, an access to a set of applications means to request a display of at least one application accessible from the token.

Still within the present description, an access to an application means to command a launch of an execution of the concerned application.

As known per se, a user accesses an application or a service embedded within a SIM (acronym for "Subscriber Identity Module") type smart card through a user selection of the considered application from a SIM menu that is displayed upon a display of the terminal.

However, such a known solution implies a disadvantage.

As a matter of fact, the user has to browse a menu that is long and tiresome for the user, in order to find an application that she or he is not sure to find because the application may not be available within the SIM menu or accessible from the SIM type smart card.

Furthermore, a document WO 2008/062090 describes another solution in which a sequence of keys provided by the terminal is to be depressed by the terminal user to activate a manager of applications, in order to access to a set of SIM type Toolkit applications.

Nevertheless, the latter known solution also has disadvantages.

Firstly, the user has to remember the sequence of keys to be depressed.

Secondly, even if the user knows the right sequence of keys to be depressed, she or he may depress a wrong sequence of keys that is not associated with a display of a SIM menu but with another undesired action.

SUMMARY OF THE INVENTION

The invention eliminates such disadvantages by providing a method for accessing one application or a set of applications from or through a token. The token is coupled to a terminal. The terminal comprises at least one touch surface.

According to the invention, the method comprises, as steps, the terminal compares an input touch pattern with at least one predetermined input touch pattern relating to one application or a set of applications accessible from the token, and, according to a comparison result, the terminal sends or not to the token either a command for requesting a display of a set of at least one application accessible from the token or a command for triggering an execution of an application accessible from the token, the command being associated with a matching predetermined input touch pattern.

The principle of the invention consists in that a terminal, which is provided with a surface on which a user can enter an input touch pattern, detects an input touch pattern entered by the user, and the terminal transmits to a token a corresponding predefined command for requesting the token either to show all or a part of the service(s) supported by the token or to execute a desired service either supported by the token or, through the token, by an external entity (such as an external server).

The proposed solution allows a user to interact with a token through a touch surface of a terminal cooperating with the token.

Accordingly, contrary to the first aforementioned known solution, a terminal user does not have to browse through a menu, so as to reach either a token menu item(s) or a service offered by or triggered from the token.

Likewise, contrary to the second aforementioned known solution, a terminal user does not have to know any specific sequence of keys to reach either a token menu item(s) or a service offered by or triggered from the token.

The proposed solution is thus convenient for the user and therefore user-friendly and allows to ease an interaction between a terminal user and a service supported by or accessible through the token.

The proposed solution increases the count of interactivity ways between a user and a service supported by or accessible through the token.

According to a further aspect, the invention is a token for accessing one application from or through the token. The token is able to cooperate with at least one external entity comprising at least one touch surface. The token comprises data storing means, data processing means and communication means for communicating with the external entity.

According to the invention, the token is adapted to receive from the external entity either a command for requesting a display of a set of at least one application accessible from the token or a command for triggering an execution of an application accessible from the token, the command being associated with a matching predetermined input touch pattern.

As token, it can be any electronic device comprising at least one microprocessor, at least one memory or being connected to one memory, and an Input/Output communication interface. The token can constitute any electronic support that may have different form factors. For example, it can be embodied within a dongle of the USB (acronym for "Universal Serial Bus") type, a smart card or a chip to be removably linked to a host.

According to a further aspect, the invention is a system for accessing an application from or through a token. The system comprises a token and a terminal cooperating with the token. The token comprises first data storing means, first data processing means and first communication means for communicating with the terminal. The terminal comprises at least one touch surface, second data storing means, second data processing means and second communication means for communicating with the token.

According to the invention, the terminal is adapted to compare an input touch pattern with at least one predetermined input touch pattern relating to one application or a set of applications accessible from the token, and, according to a comparison result, the terminal is adapted to send or not to the token either a command for requesting a display of a set of at least one application accessible from the token or a command for triggering an execution of an application accessible from the token, the command being associated with a matching predetermined input touch pattern.

As terminal, it can be, for example, a mobile telephone, a PDA (acronym for "Personal Digital Assistant"), a Personal Computer (or PC) or a mobile laptop being able to cooperate with a token.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for accessing one application or a set of applications from or through a token is implemented by a mobile phone, as terminal, in cooperation with a SIM type smart card, as token.

As SIM type smart card, it can be a smart card that securely stores an International Mobile Subscriber Identity (or IMSI), as a unique number associated with all GSM (acronym for "Global System for Mobile communications") and UMTS (acronym for "Universal Mobile Telecommunication System") network mobile phone users. The IMSI is used to identify a subscriber before at least one telecommunication network, so as to have the right to use it (them).

The SIM type smart card can be, for example, a SIM smart card for a GSM network, a Universal Subscriber Identity Module (or USIM) for a UMTS network, a Removable User Identity Module (or RUIM) and/or a Code Division Multiple Access (or CDMA) Subscriber Identity module (or CSIM) for a CDMA network. Naturally, the just aforementioned list is not exhaustive.

However, it is only for exemplifying purposes and is not considered to reduce the scope of the present invention.

For example, instead of being constituted by a SIM type smart card, the token is constituted by a smart USB dongle (that does not require any specific reader within a host computer), a mass-storage card like a MMC (acronym for "MultiMediaCard"), a SD (acronym for "Secure Digital") card, and/or any other electronic medium that may have different form factors. According to still other examples, the token can also be a chip to be fixed, possibly in a removable manner, to a host computer, or a chip to be soldered within a host computer, as terminal.

Moreover, instead of being constituted by a mobile telephone, the terminal can be, for example, a personal computer, a desktop computer, a laptop computer, and/or a PDA.

Figure 1:
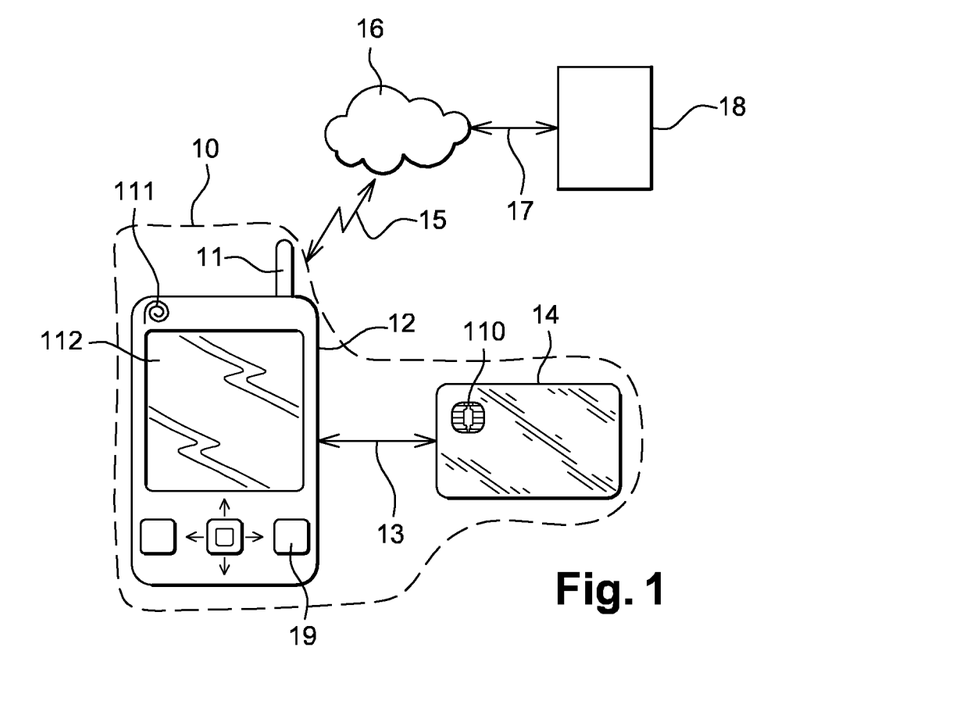
FIG. 1 illustrates a simplified diagram of an embodiment of an electronic system comprising a mobile telephone and a smart card of the SIM type coupled to the mobile telephone, the system being adapted to let interact, through at least one touch surface, a phone user with one or several applications embedded within the smart card or within an external server according to the invention.

FIG. 1 shows among others an electronic system 10, as a mobile equipment assembly.

The system 10 comprises a mobile telephone 12, as a user device, and a SIM type smart card 14 that is coupled to the mobile telephone 12, in order to cooperate with each other.

For simplicity, the mobile telephone 12 and the SIM type smart card 14 are termed hereinafter respectively the phone 12 and the card 14.

The phone 12 is provided with at least one touch surface that is actuated, for example, by a contact with a pen or a phone user finger.

For example, the phone 12 is equipped with a touch display screen 112.

According to another embodiment, the phone is equipped with a touch pad.

According to still another embodiment, the phone has at least one touch display screen and at least one touch pad.

The phone 12 includes, as data processing means, at least one microprocessor, volatile and non-volatile memories, at least two Input/Output (or I/O) interfaces linked together through a data and control bus (not shown).

The microprocessor processes and controls data within the phone 12 and/or data to be exchanged with outside of the phone 12. The microprocessor controls and communicates with all the components of the phone 12, such as the I/O interfaces.

The memories store data notably relating to an Operating System and applications supported by the phone 12.

The memories also store data relating to several input touch patterns.

The I/O interfaces comprise a contact interface (not represented) of the type ISO (acronym for <<International Standard Organization>>) 7816, as one I/O interface, to interact with the card 14. The contact interface is intended to let communicate, through a bi-directional link 13, the phone 12 with the card 14.

According to the invention, the phone 12 is adapted to interpret several input touch patterns, among which at least some input touch patterns are relative to some applications supported by the card 14 or that can be triggered through the card 14.

For example, during a set-up of the phone 12, the card 14 transmits a set of input touch patterns and an associated set of commands that relate to some applications that can be accessed, through the sensitive touch surface of the phone 12, by the user. Thus, when the user draws, upon the sensitive touch surface, one of the input touch patterns that have been provided to the phone 12 and that relate to the card 14, the phone 12 retrieves the corresponding command and sends the matching command to the card 14.

The phone 12 is adapted to communicate data with the card 14 by using Application Protocol Data Unit (or APDU).

The phone 12 has a first antenna 11, as another I/O interface, to communicate, over the air (or OTA), via a long range radiofrequency bi-directional link 15, through a cellular telecommunication network 16, with a mobile network server 18.

The cellular telecommunication network 16 is connected, for example, through a cable, via a bi-directional link 17, to the mobile network server 18. The cellular telecommunication network 16 is adapted to implement at least one communication mode, such as a 2G (acronym for a second generation network, i.e. GSM for "Global System for Mobile communications"), 3G (acronym for a third generation network, i.e.

UMTS for "Universal Mobile Telephone System") and/or CDMA (acronym for a "Code Division Multiple Access") communication mode(s).

The phone 12 has preferably the capacity to communicate with the mobile network server 18.

The mobile network server 18 is integrated within an entity of a system that can be constituted by the system usually known as a back-end OTA system. The mobile network server 18 is directly or indirectly controlled by a telecommunication operator.

To interact with the user from and/or through the card 14, the phone 12 has the capacity to implement a SIM ToolKit (or STK) mechanism by which the card 14 acts as a master while the phone 12 acts as a slave.

Thus, the phone 12 is adapted to interpret any proactive command originating from the card 14 involving for example a user operation, such as "Display text", "Set-up menu", "Select menu", "Get-inkey", and/or "Get-input".

The phone microprocessor is also configured to send back, once a displayed application has been selected among the displayed one(s), to the card 14 another command for launching an execution by the card 14 of a selected application with possible multiple selectable choice(s) and/or data entered by the user.

The user can enter data, such as a Personal Identification Number (or PIN), through a phone man machine interface comprising a keyboard 19 and the touch display screen 112.

The card 14 is inserted within the phone 12.

Figure 2:
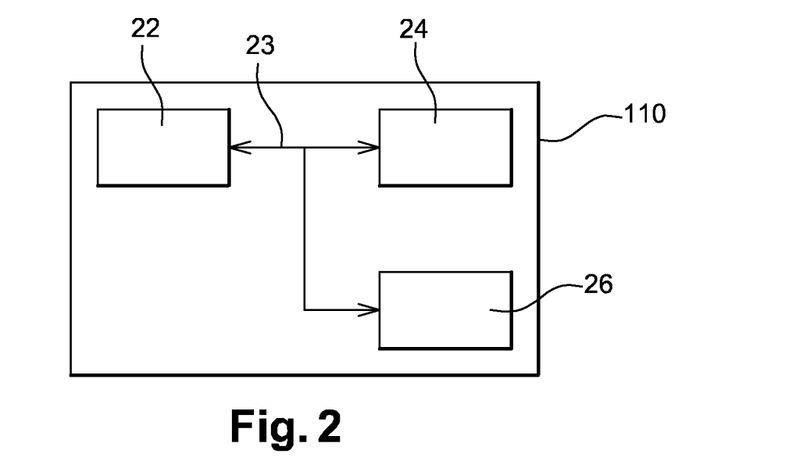
FIG. 2 represents a simplified diagram of an embodiment of the smart card of FIG. 1, as token, to be connected to the mobile telephone, as terminal of FIG. 1.

The card 14 includes a chip 110 that is further described in details in relation with the FIG. 2.

The chip 110 communicates with the phone 12, via the bi-directional link 13, through a contact interface of the type ISO 7816.

According to a preferred embodiment, the contact interface contains one contact pad used for implementing the SWP, to communicate with the phone 12 for accessing one or several applications integrated within a server (also termed Smart Card Web server or SCWS) embedded within the card 14, termed hereinafter a card server.

To interact with the user, at least some applications are accessible, via a web browser embedded within the phone 12 or the card 14, through the card 14.

According to the invention, the phone 12 is adapted to compare an input touch pattern with a list of predefined input touch patterns relating to either a display of a set of applications accessible from the card 14 or at least one application supported by the card 14 or that can be triggered from the card 14. When a user enters a registered input touch pattern relating to the card 14, then the phone 12 recognizes it and is adapted to transmit either a command for requesting the card 14 to let display a set of applications that are supported by or accessible from or through the card 14 or a command for directly triggering an execution of an application accessible from the card 14. Such a command is associated with a matching predefined input touch pattern.

A set of applications accessible from the card 14 or at least one application supported by the card 14 is displayed upon the touch display screen 112 once a phone user has drawn a specific touch input pattern upon the touch display screen 112. For example, the phone user draws a "S", so as to access a complete list of services (or applications) like a SIM ToolKit menu installed within or accessible from or through the card 14.

When an application comprised within the list is not supported by the card 14 while being accessible from or through the card 14, the application can be run by the phone 12 that stores it (or termed midlet when it is a Java application) or by a remote location, such as an external server, like the mobile network server 18 connected to the phone 12.

Thanks to the invention, to launch an execution of one application supported by or accessible from or through the card 14, the phone user has just to draw a particular touch input pattern upon the touch display screen 112. For example, the phone user draws a "P", so as to trigger an application, like a payment application, comprised within a card menu installed within or accessible from or through the card 14.

Among the applications supported by the card 14, there can be a payment application supported by the chip 110 that operates in cooperation, through the contact pad reserved for SWP and a second antenna 111 born by the phone 12, with an electronic payment terminal (not represented). Since the card 14 can support the payment application, the card 14 is assumed to act as a debit payment card with respect to the electronic payment terminal. The user has to come with the phone 12 near to the electronic payment terminal equipped with an antenna, so as to be able to let communicate the card 14 with it through the phone antenna 111.

According to an alternative, instead of accessing the payment application through the contact pad reserved for SWP, the payment application is accessed via the ISO 7816 contact interface.

According to a variant, instead of the contact pad reserved for SWP used for communicating through the second antenna 111 of the phone 12 with an electronic payment terminal, the card 14 is itself provided with an antenna (not represented).

According to another embodiment, instead of the contact interface, the card 14 and the phone 12 are coupled to each other, through a short range radiofrequency link, as contactless interface, such as a Bluetooth (registered trademark) or a Wifi (registered trademark) link.

The application selected through a drawing on the touch display screen 112 can be an action, like a function, that does not require any user interaction while being displayed via the touch display screen 112 to inform the user about the progress of the action that she or he has requested. Such a function can be an authentication function and/or an electronic signature function that uses data stored within the chip 110.

As to an application selected by the user through the phone touch screen 112, it can constitute any application embedded solely within the card 14. The selected application may have been previously either loaded during a manufacturing process of the card 14 including its personalization process or downloaded from the mobile network server 18 to the card 14 that stores it.

The selected application can encompass a payment, a transaction, a loyalty, an access to another application and/or data stored within the card 14 and/or the phone 12, a bet, and/or a survey, as one or several operations. The payment application that is installed within the card 14 can consist of an off-line transaction or an online transaction involving, for example, the mobile network server 18.

Once the selected application has been triggered, to interact with the user, the chip 110 of the card 14 can be configured to use a command, such as a proactive command, to be transmitted to the phone 12, to propose, on the card authority, through the phone touch display screen 112, a list of application(s) supported at least in part by the card 14. The command is preferably accompanied with the list of application(s) to be displayed.

For each application, one or several items can be proposed and selected by the user in accordance with her or his choice(s) to be given through the phone touch display screen 112.

Furthermore, the user can enter data for some selected application, to indicate her or his chosen personal data, in order to personalize the selected application to be executed.

Thus, an access to an application or applications supported by the card 14 is possible, through a pop-up window displayed upon the phone touch display screen 112 to propose, via a menu, an interaction with the user. The user can select through the touch display screen 112 one application among the ones that are displayed through the pop-up window.

The card 14 is able to receive another command originating from the phone 12 and for triggering an execution of another application relating to one selected service among the one(s) that has (have) been displayed with the user personal data and/or choice(s).

The card 14 may involve the mobile network server 18, the electronic payment terminal (not represented) and/or some other external entity, at least in part to completely execute the corresponding selected application.

To involve the mobile network server 18, the card 14 sends it, through the phone 12, a request allowing the mobile network server 18 to further execute the selected application.

The user can easily access an application from and/or through the card 14. Besides the card 14, a part of the application to be executed is lodged within the back-end OTA system. The mobile network server 18 can also be involved to execute the selected application.

The selected application is stored and executed by the card 14.

FIG. 2 schematically shows components incorporated within the chip 110 of the card 14 intended to cooperate with the phone 12, as host terminal, used by a user to interact with an application or a list of applications supported at least in part by the card 14.

The chip 110 comprises, as data processing means, at least one microprocessor 22, volatile and non volatile memories 24 and at least one I/O interface 26 linked together through a data and control internal bus 23.

The I/O interface 26 is used to exchange data with outside of the card 14, namely at least the phone 12, or, possibly through the phone 12, the electronic payment terminal and/or the mobile network server 18.

The microprocessor 22 executes notably any application stored within card memories 24.

The microprocessor 22 controls and communicates with all the components of the card 14, such as the memories 24 to read them and possibly write into them.

The memories 24 store data, in particular data relating to an Operating System and SIM Toolkit applications and data relating to a phone book, contacts, emails and/or a personal organizer.

The memories 24 can be constituted by one or several EEPROM (acronym for "Electrically Erasable Programmable Read-Only Memory"), one or several ROM (acronym for "Read Only Memory"), one or several Flash memories, and/or any other memories of different types, like one or several RAM (acronym for "Random Access Memory").

The memories 24 store data relating to several applications that are actuated by data originating from outside the card 14, through the I/O interface 26, for example, originating, from the phone 12 and, more exactly, by means of an input touch pattern specific to each of the applications supported by or that can be triggered by the card 14.

The application then processes data by possibly exchanging data with the phone 12, in order to interact with the phone 12 and possibly its user.

The memories 24 preferably store data relating to each input touch pattern to be drawn by a phone user upon a sensitive touch surface and recognized by the phone 12.

Each input touch pattern can have been loaded either during the personalization of the card 14 (i.e. preferably at the end of the manufacture process), or downloaded from an external server, such as the mobile network server 18, or defined by or configured by the user once she or he owns the card 14 with the help of an host device, such as her or his phone 12.

The memories 24 preferably store data relating to a command to be received from the phone 12 for each input touch pattern to be drawn by a phone user upon a sensitive touch surface and recognized by the phone 12.

The chip 110 of the card 14 is arranged to receive from outside through the I/O interface 26 a command for requesting a display of all the applications that can be triggered from the chip 110 of the card 14. More exactly, once the chip 110 of the card 14 receives such a command, the chip 110 of the card 14 is adapted to generate another command for requesting the host device to display the applications that the chip 110 supports. This other command is then transmitted by the chip 110 to the host device.

Likewise, the chip 110 of the card 14 is arranged to receive from outside, through the I/O interface 26, a command for triggering an execution of an application from the chip 110 of the card 14. More exactly, once the chip 110 of the card 14 receives such a command, the chip 110 of the card 14 is adapted to run a targeted application that the chip 110 supports. The chip 110 of the card 14 may involve another entity, such as its host, by sending it another command.

Each command can have been loaded either during the personalization of the card 14 (i.e. preferably at the end of the manufacture process), or downloaded from an external server, such as the mobile network server 18.

Preferentially, the chip 110 of the card 14 is arranged to provide the phone 12, as host device, with all the predefined input touch patterns and corresponding commands to be sent by the phone 12 to the card 14, so as to trigger at least one action from the card 14.

The memories 24 also store data relating to at least one event-status is to be surveyed by the card 14. The event-status can be the time. The event-status is used to trigger a check by the card 14 whether a service is available.

The memories 24 may comprise credentials, such as a PIN and/or keys. The credentials can be used to authenticate the user before the mobile network server 18 and/or sign data to be sent to outside world, like the mobile network server 18, possibly by using data that is received from outside.

The memories 24 can store at least one application providing at least one security function, a digital signature, a user identification, a user authentication, an on-board key generation, and/or a secure exchange for online transactions.

The card 14 allows to obtain a portable electronic medium that is user-friendly since a user can access, through a touch surface of its host device, to a list of applications supported by the card 14 or that can be launched from or through the card 14 and/or directly to at least some applications, each of such applications being triggered by a specific input touch pattern.

Thus, the interaction between the user and the applications supported by the card 14 is easy. As a matter of fact, the user does neither have to browse a list of the applications offered through the phone 12 nor to remember any sequence of keys to access an application or a set of applications that can be launched from the card 14.

Each concerned application supported by the chip 110 of the card 14 can be included within a SIM ToolKit (or STK)

menu, within a list of applications accessible through a card server, and/or within a list of applications accessible through an external server, like the mobile network server 18.

Figure 3:
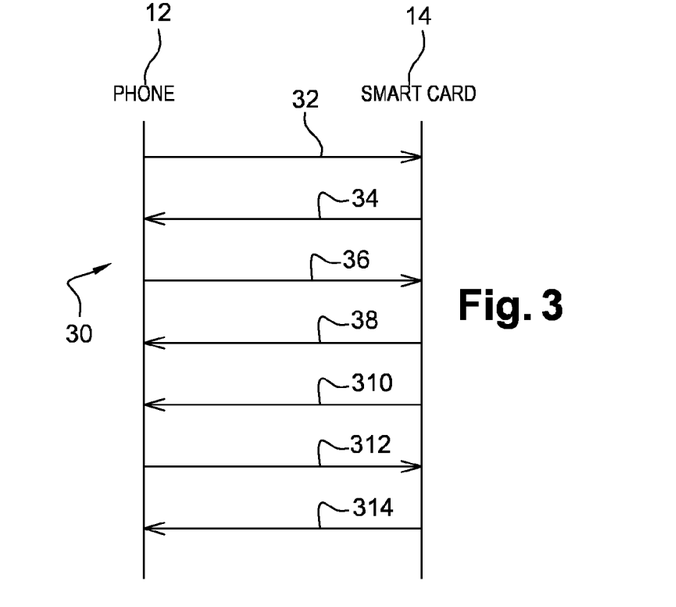
FIG. 3 is an example of a message flow between the mobile telephone and the smart card of FIG. 2.

FIG. 3 depicts an example of a message flow 30 that involves the phone 12 and the card 14. An exchange of messages between the phone 12 and the card 14 causes a configuration of the phone 12. Thus, the configuration of the phone allows a user to directly access to directly access a first level relating to at least one service(s) offered from or through the card 14, namely a list of services, for example STK applications (or termed a STK menu).

It is assumed that the phone 12 or the card 14 has detected a coupling with other entity, namely the card 14 or the phone 12 respectively.

The phone 12 sends to the card 14 a command 32, such as a so-termed "TERMINAL PROFILE", including information about the equipment of the phone 12 comprising notably a touch screen display 112. The phone 12 thus informs the card 14 about, besides the STK commands the phone 12 supports, the phone capacity relating to at least one touch surface. The card 14 then knows that the phone 12 is able to detect and analyse, through an electrical contact, a touch pattern drawn upon its touch screen display 112.

Once the card 14 receives the command about the phone capability relating to at least one touch surface, the card 14 is actuated and knows that the card 14 can supply its host with a predetermined input touch pattern. When the predetermined input touch pattern is recognized by the phone 12, a user accesses a first level relating to a menu of STK applications.

To access a first level relating to a menu of STK applications, the card 14 stores (or accesses) a command for requesting a display of a set of at least one application accessible from the card 14, such as a "SET-UP MENU COMMAND". The card 14 is likely to send to the phone 12 the command for requesting a display of a set of at least one application accessible from the card 14. The command for requesting a display of a set of at least one application accessible from the card 14 has preferably to be accompanied with the predetermined associated input touch pattern preferably stored within the card.

Then, the card 14 sends to the phone 12 data 34, such as "91XX", meaning that the card 14 has some piece of data available to the phone 12 with a length equal to "XX" in hexadecimal.

When the phone 12 has received and interpreted the data 34 sent by the card 14, the phone 12 sends to the card 14 a command 36 for receiving, such as "FETCH SET-UP MENU COMMAND", the command for requesting a display of a set of at least one application accessible from the card 14 and a corresponding input touch pattern.

Then, the card 14 sends to the phone 12 data 38, such as "9000", meaning that the card 14 has received and well interpreted the command 36 for receiving the command for requesting a display of a set of at least one application accessible from the card 14.

The card 14 sends to the phone 12 one single message 310 encompassing a command for requesting a display of a set of at least one application accessible from the card 14 and the predetermined associated input touch pattern. The command for requesting a display of a set of at least one application accessible from the card 14 is to be sent from the phone 12 to the card 14 as soon as the phone 12 detects the predetermined associated input touch pattern.

According to an alternative, the card 14 sends to the phone 12, after a command for requesting a display of a set of at least one application accessible from the card 14, the predetermined input touch pattern associated with the command for requesting a display of a set of at least one application accessible from the card 14 by means of several messages.

Once configured, the phone 12 analyses any input touch pattern possibly with respect to a list of predetermined input touch patterns that are to be retrieved.

The phone 12 detects that a user draws an input touch pattern, the phone 12 compares it with the predetermined input touch pattern associated with at least one command to address to the card 14.

When the entered input touch pattern matches with the predetermined input touch pattern associated with a command for requesting a display of a set of at least one application accessible from the card 14, the phone 12 sends to the card 14 a command 312 for requesting a display of a set of at least one application accessible from the card 14.

After receipt and interpretation of the command 312 for requesting a display of a set of at least one application accessible from the card 14, the card 14 sends to the phone 12 another command 314, such as a corresponding proactive command, for requesting the phone 12 to display to the user a menu relating to all the applications supported by the card 14 or that can triggered from the card 14.

Once the phone 12 has displayed the menu to the user, the phone 12 may send back (not represented) to the card 14 a command for triggering an execution of an application accessible from the card 14, as one selected menu item amongst the displayed menu items, such as a "TERMINAL RESPONSE" with the service selected by the user. Then, the card 14 executes the targeted application or sends to the phone 12 or through the phone 12 or to another external entity that can be directly connected to the card 14 (like a terminal that is wireless linked to the card 14) a command to an external entity to execute the targeted application.

Figure 4:
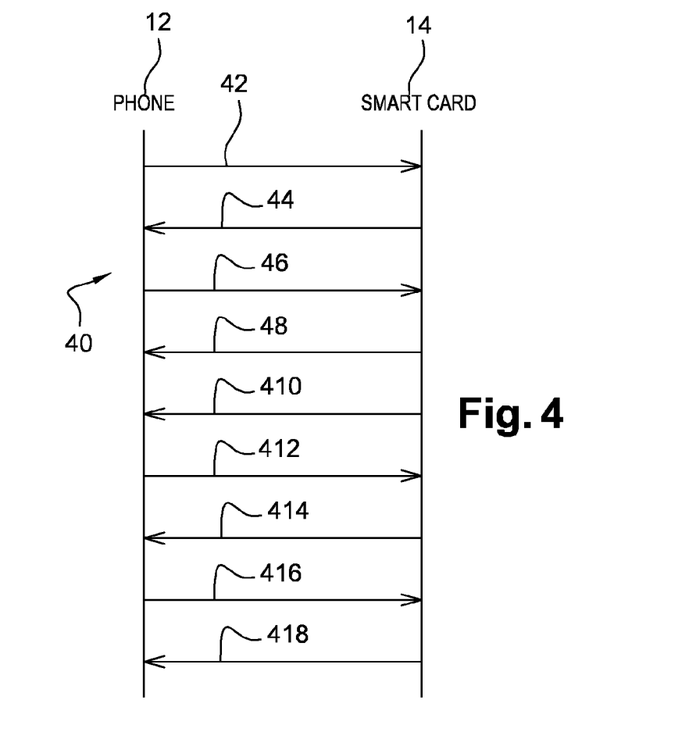
FIG. 4 is another example of a message flow between the mobile telephone and the smart card of FIG. 2.

FIG. 4 shows another example of a message flow 40 that involves the phone 12 and the card 14. An exchange of messages between the phone 12 and the card 14 causes a configuration of the phone 12. Thus, the configuration of the phone 12 allows a user to directly access a second level relating to a service offered from or through the card 14, for example one STK application among several STK applications.

It is assumed that the phone 12 or the card 14 has detected a coupling with the other entity, namely the card 14 or the phone 12 respectively.

Firstly, the phone 12 sends to the card 14 a command 42, such as a so-termed "TERMINAL PROFILE", including information about the equipment of the phone 12 comprising notably a touch screen display 112. The card 14 then knows that the phone 12 is able to detect and analyse, through an electrical contact, a touch pattern drawn upon its touch screen display 112.

Once the card 14 receives the command about the phone capability relating to at least one touch surface, the card 14 is actuated and knows that the card 14 can supply its host with at least one predetermined input touch pattern that is associated with one service offered from or through the card 14.

Then, the card 14 sends to the phone 12 data 44, such as "91XX", meaning that the card 14 has some piece of data available to the phone 12 with a length equal to "XX" in hexadecimal.

The card 14 stores (or accesses) a command for launching an execution of one application accessible from or through the card 14, such as an automatic call to a server relating to a sport, like rugby, to follow in live a sport match. The card 14 is likely to send to the phone 12 the command for running one application accessible from the card 14 that is chosen by the user. The command for running one chosen application accessible from the card 14 has preferably to be accompanied with the predetermined associated input touch pattern preferably stored within the card 14, like a "R" (as an abbreviation of the word "Rugby").

When the phone 12 has received and interpreted the data 44 sent by the card 14, the phone 12 sends to the card 14 a command 46 for receiving, such as "FETCH COMMAND", a command for requesting an execution of one application accessible from or through the card 14 and a corresponding input touch pattern.

Then, the card 14 sends to the phone 12 data 48, such as "9000", meaning that the card 14 has received and well interpreted the command 46 for receiving the command for requesting an execution of one application accessible from or through the card 14 and a corresponding input touch pattern.

The card 14 sends to the phone 12 one single message 410 encompassing a command for requesting an execution of one application accessible from or through the card 14 and the predetermined associated input touch pattern. The command for requesting an execution of one application accessible from or through the card 14 is to be sent from the phone 12 to the card 14 as soon as the phone 12 detects the predetermined associated input touch pattern.

Thus, when the predetermined associated input touch pattern is recognized by the phone 12, a user directly accesses to one of the applications relating to, for example, a STK. To do this, when the predetermined associated input touch pattern is recognized by the phone 12, the phone 12 sends to the card 14 the command for running one chosen application accessible from or through the card 14.

Once having being configured by the card 14, the phone 12 detects an input touch pattern and compares it with at least one predetermined associated input touch pattern relating to a triggering of an execution of an application accessible from or through the card 14. When the just entered input touch pattern matches with a predetermined associated input touch pattern, the phone 12 sends to the card 14 the command for executing one chosen application accessible from or through the card 14.

For example, when the phone 12 detects a "R" (after comparison with at least some of the provided input touch pattern(s)), the phone 12 sends to the card 14 a command 412 for executing one chosen application accessible from or through the card 14. Once the card 14 receives and interprets the command 412 for executing one chosen application accessible from or through the card 14, the card 14 actuates the targeted application by running the concerned application.

In the present case, the card 14 executes a corresponding application causing a connection to an external server that may be connected through the phone 12, like the server 18. To connect to the server, the card 14 transmits to the phone 12 a command 414 for connecting the addressed server possibly accompanied with data relating to the required service to be provided, like data relating to a particular sport among the one(s) managed by the server and/or data relating to a particular match to be followed in live.

The command 414 for connecting the addressed server causes the phone 12 to open a connection session with the addressed server.

The addressed server is then involved and requested to execute a part of the application triggered by the card 14.

Further to the opening of the connection session, the solicited server processes the command and may send back to the phone 12 a response, for example comprising the current score of the rugby match to be surveyed further to the request originating from the user. According to such an example, a service is a follow-up of a rugby match that the user can select in order to follow in live the progress of the score between two teams.

The phone 12 then forwards a corresponding response 416 to the card 14.

Finally, possibly after the card 14 has received the response 416, the card 14 may process it and send back to the phone 12 a command 418 for displaying at least one piece of information relating to a success or a non-success of the execution of the application, a resulting response and/or a result of the execution of the application.

Figure 5:
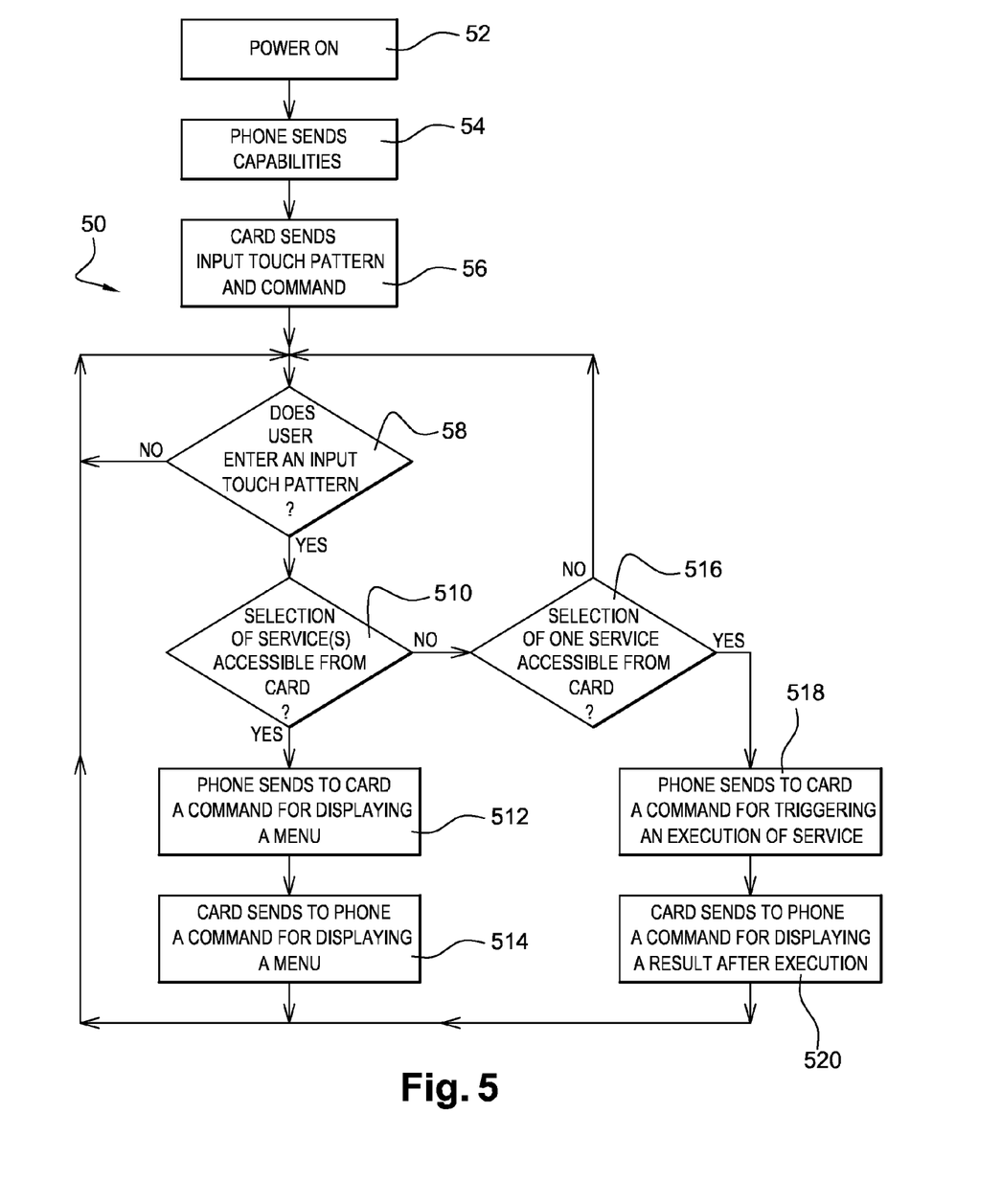
FIG. 5 illustrates a flow chart of an exemplifying method for accessing one application or a set of applications accessible from or through the smart card of FIG. 2.

FIG. 5 depicts an exemplary embodiment of the invention method 50 for accessing a service or set of services offered from or through the card 14.

This invention method 50 includes different steps that are further described in one embodiment in which a proactive mechanism may be used, once the card 14 has received from the phone 12 a command corresponding to a referenced input touch pattern either to request a display of the available service(s) upon the phone touch display screen, at the initiative of the card 14, or to trigger an execution of an application supported only by the card 14.

However, according to another embodiment, an external entity, such as an external server is involved further to a command originating from the card 14 and executes a part of the requested application.

As known per se, the proactive mechanism allows to use STK commands initiated by the card 14, in order to manage at least one STK application involving an execution of an application by the card 14.

Firstly, the phone 12 is 52 powered up and the card 14 is also powered up (by using a power originating from the phone 12).

Then, the phone 12 sends 54 to the card 14 a message for indicating its capabilities, notably in terms of the proactive commands the phone 12 supports and relating to at least one touch surface comprised within the phone 12 (or linked to the phone 12, such as a touch display screen connected to the phone 12 through a short-range wireless radiofrequency).

The card 14 is thus able to interact with the phone 12 while using STK commands.

The card 14 is thus able to provide the phone 12 with at least one input touch pattern to be detected by the phone 12 and at least one corresponding associated command to be sent from the phone 12 to the card 14.

During an initialization (or configuration) phase 56, the card 14 sends to the phone 12 data relating to a command for requesting a display of a set of at least one application accessible from the card 14 and/or a command for triggering an execution of an application accessible from the card 14 preferentially accompanied with its respective associated input touch pattern. An input touch pattern(s) can be for example a "D" for a display of a set of at least one application accessible from the card 14 and/or a "P" for launching a display of a phonebook stored within the card 14 assuming that such an application is supported by the card 14 itself.

Once the phone 12 knows the input touch pattern(s) relating to command(s) to be sent to the card 14, the phone 12 is likely to detect a matching with one of the concerned input touch pattern(s).

Then, the phone 12 analyses 58 whether a user enters an input touch pattern by drawing upon one of its touch surface, such as its touch display screen 112.

If the user does not enter any input touch pattern, then the phone 12 continues to analyze 58 whether a user enters an input touch pattern.

On the contrary, i.e. if the user enters one input touch pattern, then the phone 12 checks 510 whether the entered input touch pattern matches with the input touch pattern associated with a request for a display of a set of at least one application accessible from the card 14.

If the entered input touch pattern corresponds with the input touch pattern that is paired with a command for requesting a display of a set of at least one application accessible from the card 14, then the phone 12 sends 512 to the card 14 the command for requesting a display of a menu relating to the card 14.

When the card 14 has received and analyzed the command for requesting a display of the application(s) that can be accessed from or through the card 14, then the card 14 sends back 514 to the phone 12 a command for displaying the menu item(s) offered by the card 14, such as a proactive command for displaying at least one listing of the proposed service(s), such as "display menu".

Once the phone 12 has received and interpreted the command for displaying the menu item(s) offered by the card 14, then the phone 12 displays, by means of the touch display screen 112, a window presenting at least one piece of information for each service accessible from the card 14.

After having performed the previous step 514, we go back to the step 58 in which the phone 12 analyses whether a user enters an input touch pattern by drawing upon one of its touch surface.

In case where the entered input touch pattern does not correspond with the input touch pattern that is paired with a command for requesting a display of a set of at least one application accessible from the card 14, then the phone 12 checks 516 whether the entered input touch pattern matches with the input touch pattern associated with a request for triggering an execution of one application accessible from the card 14.

According to another embodiment (not represented), the step 510 in which the phone 12 checks whether the entered input touch pattern matches with a request for a display of a set of at least one application accessible from the card 14 and the step 516 in which the phone 12 checks whether the entered input touch pattern matches with a request for triggering an execution of one application accessible from the card 14 are interchanged. In other words, when the user has entered an input touch pattern, the phone 12 checks firstly whether the entered input touch pattern matches with a request for triggering an execution of one application accessible from the card 14, and, if it is not the case, then the phone 12 checks whether the entered input touch pattern matches with a request for a display of a menu managed from the card 14.

When, after comparison with each of the predefined input touch patterns relating to an involvement of the card 14, the phone 12 does not detect any matching with one of the predefined input touch patterns relating to an involvement of the card 14, we go back to the step 58 in which the phone 12 analyses whether a user enters an input touch pattern by drawing upon one of its touch surface.

When the phone 12 detects that the entered input touch pattern matches with the input touch pattern associated with a request for triggering an execution of one application accessible from the card 14, the phone 12 sends 518 to the card 14 a command for triggering an execution of one application supported by the card 14.

The card 14 receives the command for triggering an execution of one application supported by the card 14 and triggers an execution of the targeted application stored within the card 14. The execution of the targeted execution may also involve an external entity by means of a sending of a corresponding request, through the phone 12, to the external entity. The external entity sends back to the card 14, through the phone 12, a corresponding result response.

Optionally, the card 14 sends 520 to the phone 12 a proactive command for displaying at least one piece of information relating to a success, a non-success and/or a result of the execution of the application, for example a window presenting a phonebook stored within the card 14.

Finally, once the phone 12 has sent to the card 14 a command for executing a proposed service, the phone 12 analyses 58 whether a user enters an input touch pattern by drawing upon one of its touch surface.

The described invention method allows to improve an interactivity level from the phone user with the card 14 by directly accessing to either a listing of application(s) stored within the card 14 or a service supported (at least in part) by the card 14.

The invention claimed is:

1. A method for accessing at least one application from or through a token, the token being coupled to a terminal, the terminal comprising at least one touch surface, comprising the following steps:
    sending, by the token, to the terminal, (i) at least one predetermined input touch pattern, and (ii) at least one command associated with at least one predetermined input touch pattern,
    wherein, when an input touch pattern is input at a touch surface, sending, by the terminal, to the token, a command associated with the input touch pattern, the command being either a command for (i) requesting a display of a set of at least one application accessible from or through the token or (ii) for triggering an execution of an application accessible from or through the token.

2. Method according to claim 1, wherein the method further comprises the steps in which the terminal compares an input touch pattern with at least one received input touch pattern relating to one application or a set of applications accessible from or through the token, and
    according to a comparison result, selectively sending to the token, by the terminal, either a command for requesting a display of a set of at least one application accessible from or through the token or a command for triggering an execution of an application accessible from or through the token, the command being associated with a predetermined input touch pattern.

3. Method according to claim 1, wherein, in response to receiving the command for triggering an execution of an application accessible from or through the token, the token executes an application accessible from or through the token.

4. Method according to claim 1, wherein, the terminal is connected to an external server, and further comprising a step in which the token sends, through the terminal, to the external server a request for the external server to execute the triggered application.

5. Method according to claim 1, wherein the application is selected from the group including the following elements: an application relating to a Subscriber Identity Module type toolkit; an application accessible from a server embedded within the token; and an application accessible, through the token, and from an external server connected to the terminal.

6. Method according to claim 1, wherein, in response to receiving a command requesting a display of a set of at least one application accessible from or through the token, the token sends to the terminal a command for displaying at least one menu item.

7. Method according to claim 6, further comprising a step in which the terminal sends to the token a command for triggering an execution of an application relating to one selected menu item amongst the at least one menu item, in response to the command for displaying at least one menu item.

8. A token for accessing at least one application, the token being able to cooperate with at least one external entity, comprising:
- data storing means,
- data processing means, and
- communication means for communicating with the external entity,
- wherein the token is configured to send, to the external entity, at least one predetermined input touch pattern and at least one command associated with at least one predetermined input touch pattern, and
- wherein, when an input touch pattern is input at a touch surface, the token is configured to receive, from the external entity, a command associated with the input touch pattern, the command being either a command for requesting a display of a set of at least one application accessible from or through the token or a command for triggering an execution of an application accessible from or through the token.

9. A system for accessing at least one application from or through a token, the system comprising:
- a terminal and the token, the token cooperating with the terminal,
- the token comprising:
  - first data storing means,
  - first data processing means, and
  - first communication means for communicating with the terminal,
- the terminal comprising:
  - at least one touch surface,
  - second data storing means,
  - second data processing means, and
  - second communication means for communicating with the token,
- wherein the token is configured to send to the terminal at least one predetermined input touch pattern and at least one command associated with at least one predetermined input touch pattern, and
- wherein, when an input touch pattern is input at a touch surface, the terminal sends to the token a command associated with the input touch pattern, the command being either a command for requesting a display of a set of at least one application accessible from or through the token or a command for triggering an execution of an application accessible from or through the token.

10. System according to claim 9, wherein the terminal is a mobile phone.

11. Token according to claim 8, wherein the token comprises a smart card of the Subscriber Identity Module type.

* * * * *